Oct. 30, 1951     W. F. KANNENBERG     2,573,148
TUNABLE RESONANCE CHAMBER

Filed April 3, 1945     3 Sheets-Sheet 1

INVENTOR
W. F. KANNENBERG
BY
E. V. Griggs
ATTORNEY

Oct. 30, 1951 — W. F. KANNENBERG — 2,573,148
TUNABLE RESONANCE CHAMBER
Filed April 3, 1945 — 3 Sheets-Sheet 2

INVENTOR
W. F. KANNENBERG
BY
E. V. Griggs
ATTORNEY

Oct. 30, 1951   W. F. KANNENBERG   2,573,148
TUNABLE RESONANCE CHAMBER
Filed April 3, 1945   3 Sheets-Sheet 3

INVENTOR
W. F. KANNENBERG
BY
E. V. Griggs
ATTORNEY

Patented Oct. 30, 1951

2,573,148

UNITED STATES PATENT OFFICE 2,573,148

TUNABLE RESONANCE CHAMBER

Walter F. Kannenberg, Lyndhurst, N. J., assignor to Bell Telephone Laboratories, Incorporated, New York, N. Y., a corporation of New York Application April 3, 1945, Serial No. 586,307

15 Claims. (Cl. 178—44)

This invention relates to electrical testing systems.

One object of the invention is to provide a testing system comprising a tunable cavity resonator with an input circuit which may be varied with the tuning of the resonator to maintain conditions of maximum efficiency.

Another object of the invention is to insure that a wave guide remain effectively at a fixed multiple of a quarter wavelength of the operating frequency as the frequency is varied.

An additional object of the invention is to provide an effective wave guide input at the end of a cavity resonator having a variable position end plate.

Another object of the invention is to insure that the variable position end plate of a cavity resonator may, after positioning, be locked in position without disturbing the setting of the end plate.

In accordance with the invention, a testing system comprises a tunable cavity resonator of cylindrical type with a pivotally mounted end plate the plane of which may be varied to secure optimum internal resonance conditions. Coupled to the resonator through an aperture in the end plate is a wave guide input circuit including a wave guide switch which is normally in such a position as to interrupt transmission and is remotely controlled to permit transmission through the wave guide during testing intervals. The wave guide section on the side of the switch remote from the resonator is maintained at effectively a quarter wavelength of the operating frequency by a constriction wall controlled by the resonator tuner. The pivotally mounted end plate of the resonator is held in position by adjusting bolts and compression springs. After the end plate has been set in the desired position, it may be locked in that position by a lock-nut device which does not disturb the position of adjustment irrespective of any backlash at the threads of the bolts which hold the plate in position.

Figure 1:
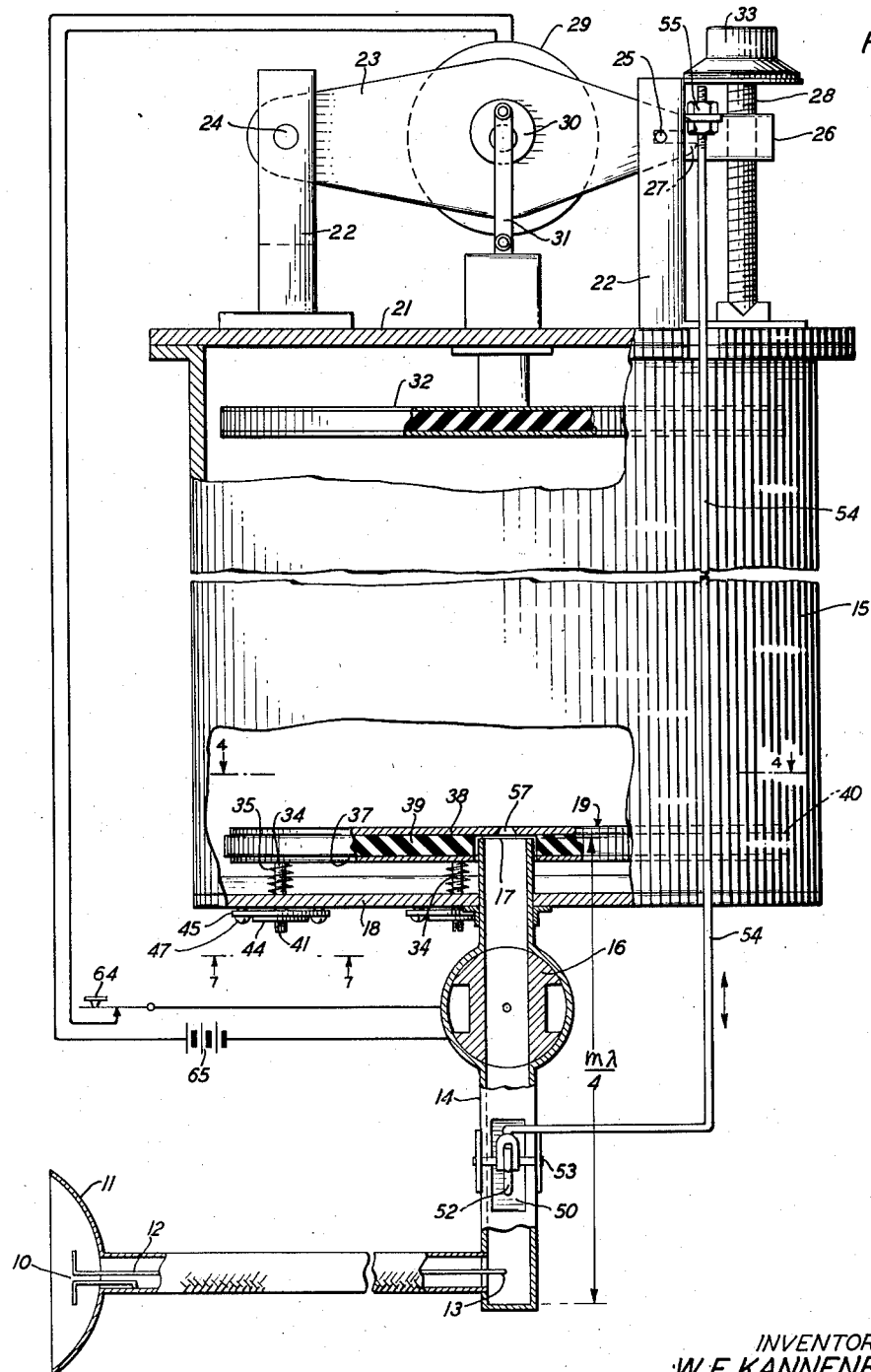
Fig. 1 illustrates schematically, with portions in section, a testing apparatus embodying the invention.
Figure 3:
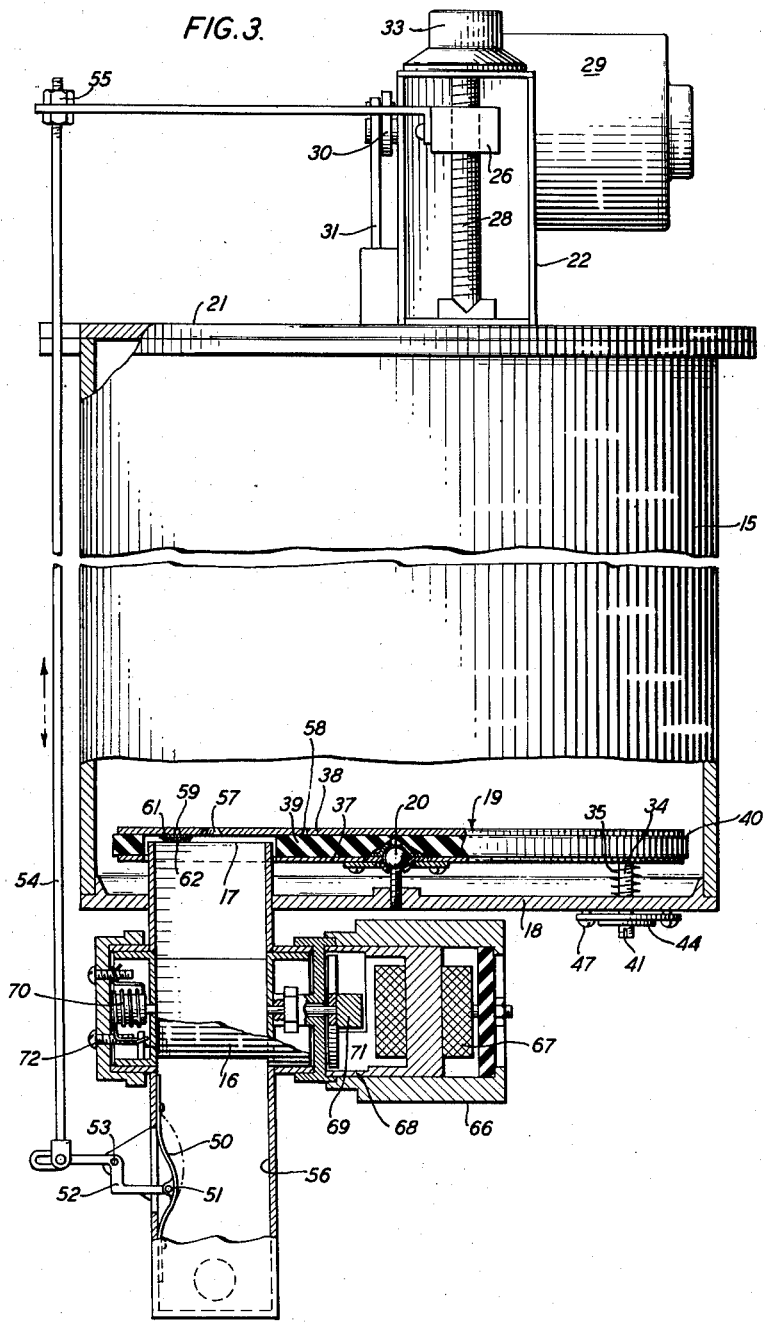
Fig. 3 is a partial elevation of the structure of Fig. 1 viewed from the right to show the wavelength adjusting mechanism for the wave guide and the actuating structure of the wave guide switch.

Fig. 1 shows a phantom target for radio object locators of the general type disclosed and claimed in the application of Kannenberg-Kinzer-Schramm-Wilson, Serial No. 544,990, filed July 14, 1944 for Testing System, which issued as United States Patent No. 2,537,139 on January 4, 1951. The system shown in Fig. 1 comprises a microwave pick-up device comprising dipole 10 associated with a suitable reflector or collector 11. The dipole is connected through a coaxial section 12 and a probe coupler 13 to a wave guide input 14 for the tunable cavity resonator 15. Interposed in the wave guide 14 between the probe 13 and the resonator is a wave guide switch 16 of the rotatable type disclosed and claimed in application Serial No. 579,105, filed February 21, 1945, for Electrical Wave Guide Switches by W. F. Kannenberg or in the corresponding British Patent No. 635,900 published April 19, 1950. The wave guide 14 extends through and fits closely within an aperture in the lower end plate 18 of the cavity resonator. Its upper end 17 extends to a position closely adjacent an upper metallic plate 38 of a movable end plate 19 pivotally mounted at 20 as indicated in Fig. 3.

The resonator 15 comprises a circular cylindrical chamber of conducting material such as copper or aluminum with an interior coating of high conductivity material such as silver. The lower end plate 18 and the upper or cap end plate 21 may be attached to the cylindrical side wall in any desired manner. Supported upon the cap plate 21 is a tuning device of the type disclosed in United States Patent No. 2,537,139, to which reference has been made. This device comprises supporting posts 22, a frame 23 pivotally mounted at 24 on one of the posts 22 and movable about its pivot by a horizontal pin 25 carried by the block 26 and fitting slidably within the slot 27 in the end of plate 23. Block 26 is provided with a screw-threaded aperture which cooperates with the adjusting screw 28 to enable adjustment of the vertical position of the block 26 and of the pin 25 and the plate 23. A motor 29 fixedly mounted on the plate 23 is connected through an eccentric or crank mechanism 30 with a piston rod 31 and tuning piston 32 which serves to tune the resonator 15 by varying its internal volume. Accordingly, when the motor 29 is in operation it serves to cause reciprocation of the piston 32 between a definite upper limiting position and a definite lower limiting position. These limiting positions may both be raised or lowered by turning the cap 33 of the adjusting screw 28 to move the block 26 and the motor 29 vertically.

Figure 6:
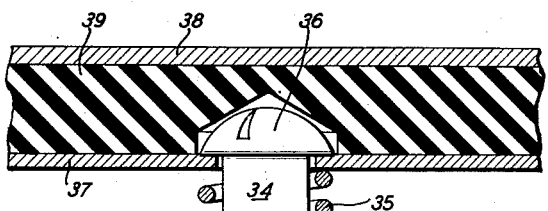
Fig. 6 shows in section a locking device for holding the adjusted end plate in position.
Figure 7:
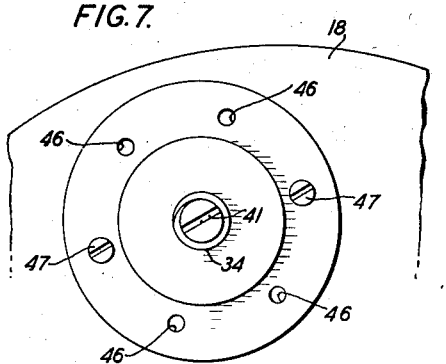
Fig. 7 is a partial end view of the external surface of the lower end plate of the resonator looking in the direction of the arrows from the plane 7—7 of Fig. 1.

It has been found that the conditions for oscillation of a desired mode within the resonator 15 may be substantially improved by adjustment of the end plate 19 to parallelism with the end plate 32 or to a position which is perpendicular to a side wall of the resonator 15. To enable the end plate 19 to be adjusted about its pivot 20, an expedient of the type disclosed and claimed in application Serial No. 543,830, filed July 7, 1944 by W. A. Edson and W. F. Kannenberg for Testing Equipment, which issued as United States Patent No. 2,471,419 on May 31, 1949 may be employed. However, instead of the precise adjusting device of the Edson-Kannenberg patent which involves four positioning bolts, it is preferred in the present instance, because of simplicity and economy of time in adjustment, to use only two positioning bolts 34 placed at 90-degree circumferential separations with reference to the central pivot 20. Surrounding each of the bolts 34 is a compression spring 35. As shown in greater detail in Fig. 6, the bolts may be provided with heads 36 held in position between the metallic reinforcing plate 37 and the high conductivity electroplated copper disc 38 which together with the intermediate wall 39 of suitable dielectric material constitute the movable end plate 19. The end plate 19 may be faced with a high conductivity plate 38 of shorter radius than plate 19 as indicated at 40 to leave a circumferential gap between the perimeter of the conducting plate 38 and the side wall 15 for the purpose of discriminating in favor of certain desired modes of oscillation and against certain undesired modes.

Positioning bolts 34 extend through screw-threaded openings in the lower end plate 18 and may be adjusted to any desired position by the use of a screwdriver cooperating with their external slotted heads 41. When adjusted in position, the bolts will each be subjected to a tension by a spring 35 which reacts to draw the screw threads of the bolt 34 against the upper surfaces of the screw threads of the plate 18 as indicated by the heavy contact lines 42. Any backlash which may exist because of looseness of the screw threads will enable the lower surfaces of the screw threads on the bolts to separate as indicated at 43. If the usual lock-nut were to be applied and screwed up on the bolt 34 into engagement with the lower end plate 18, it would serve when tightened to exert a downward force upon the bolt 34 against the reaction of the spring 35, thus causing backlash and bringing the lower surfaces of the screw threads on the bolt into engagement with the screw thread surfaces of the plate 18. This would give rise to a shift in the position of the movable end plate 19 and would spoil the nice adjustment which had been previously made. In order to avoid this effect, a lock-nut 44 is provided with a peripheral flange portion 45 having holes 46 through which small screws 47 may pass. (See Fig. 6.) Tapped in the lower surface of the lower end plate 18 are two threaded holes within which the screws 47 will fit. The lock-nut 44 is accordingly threaded upon the bolt 34 up to a point just short of contact with the lower end plate 18. It is then adjusted slightly in position by rotation until a pair of diametrically opposite holes 46 in the lock-nut are aligned with the two tapped holes in the lower end plate 18. Screws 47 are then introduced and are tightened until the lock-nut 44 grips bolt 34 firmly locking it against displacement. As will be apparent, this causes the lock-nut 44 to engage threads of the bolt 34 on their under surfaces as at 42, thus tending to urge the bolt 34 in the same direction in which it was originally urged by the resilient compression springs 35. Accordingly, the operation of locking the bolt 34 in position by means of the lock-nut 44 does not disturb the position to which the movable end plate 39 was originally set.

It has been found that the impedance conditions in the wave guide input are important for most efficient operation of the apparatus. The wave guide section 14 when in transmitting condition as shown in Fig. 1 should preferably have an over-all dimension $$m\frac{\lambda}{4}$$

measured on the inside of the resonator equal to an even number of quarter wavelengths. However, in the closed position of Fig. 2, the length measured on the inside of the short-circuited section should be $$n\frac{\lambda}{4}$$

where $n$ is an odd integer. For the most efficient design, the wave guide section 14 will accordingly have these dimensions in the transmitting and the short-circuited positions, respectively, for the mean wavelength at which the resonator 15 is intended to operate. The more important of these two criteria is the odd number of quarter wavelengths for the interrupted circuit position of Fig. 2. Since in some types of apparatus it may be desirable to vary the tuning over a range as high as 10 per cent of the mean frequency, it is advantageous in order to meet the condition of varying wavelength to be able to change the effective wavelength of the short-circuited wave guide section. This may be accomplished by means of a movable inner wall 50 constituting one of the narrower walls of the wave guide section. The movable wall 50 may comprise a resilient flat strip having its ends loosely held in position by rivets passing through slots in the wall 50 which may slide with respect to the rivets. Pivotally connected to the movable wall 50 at 51 is a bell crank 52 pivoted at 53 on a support attached to the exterior of the wave guide. A long rod 54 is pivotally connected at its lower end to the arm of the bell crank 52 and is connected by an adjustable screw-threaded connection 55 to the adjusting block 26. It follows that an adjustment by means of the screw 28 of the mean frequency of the resonator 15 causes an adjustment of the position of the wall 50 which bows inwardly in the wave guide section 14. The propagation velocity of the wave guide 14 is dependent upon the wave guide dimension between the flexible wall 50 and the opposite wall 56. By a suitable design of the flexible portion 50 and of the bell crank, it is possible to cause the interrupted wave guide section illustrated in Fig. 2 to remain at approximately an odd number of quarter wavelengths $$n\frac{\lambda}{4}$$

for the mean frequency of operation of the resonator 15. Maintenance of the short-circuited wave guide at an odd quarter wavelength is found to be an effective expedient for precluding leak of microwave energy past the switch 16 when in the circuit interrupting position.

The open end 17 of the wave guide is preferably brought into close proximity with the coupling aperture 57 in the movable end plate 19. In most practical applications, separation of the order of one-thirty-second of an inch between the open end of the wave guide and the metallic face plate 38 is found satisfactory. The aperture itself may advantageously be made of conical form with the smaller opening presented to the resonator.

Figure 4:
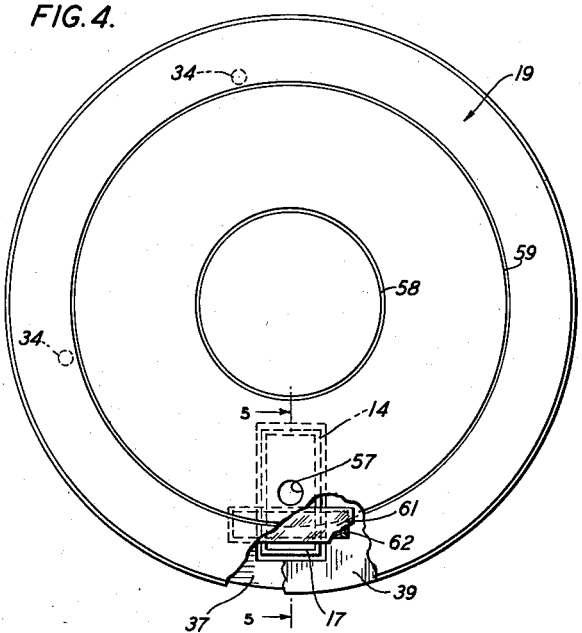
Fig. 4 is a plan view of the adjustable end plate of the cavity resonator of Fig. 1 looking in the direction of the arrows as viewed from the plane 4—4 of Fig. 1.
Figure 5:
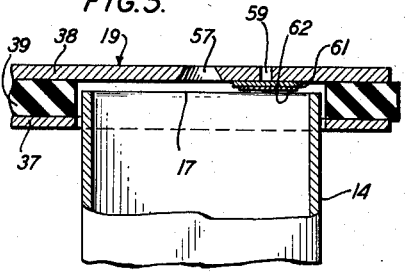
Fig. 5 is a section on an enlarged scale along the line 5—5 of Fig. 4.

In apparatus of the type disclosed, it is frequently desirable in the interests of suppression of certain undesired modes of oscillation to interrupt the high conductivity coating along lines which intersect a path of current flow for the undesired mode of oscillation. For example, in resonators of the type disclosed herein designed for $TE_{0,1,19}$ mode oscillations, it is desirable to discriminate against $TM_{1,1,19}$ mode oscillations which tend to cause radial flow of current. For that purpose, the high conductivity surface plate 38 is cut through to the dielectric 39 by concentric slots 58 and 59 as illustrated in Fig. 4. These slots serve to preclude radial flow of current and thus discriminate strongly against modes of oscillation involving radially directed electric vectors. If, however, one of these slots as, for example, the slot 59 shown in Fig. 4 overlies the position of the open end 17 of the wave guide, there would be a tendency for energy to be transmitted by the path from the resonator through the slot and the dielectric material to the open end 17 of the wave guide. In order to substantially eliminate this tendency there may be applied as shown in Figs. 3, 4 and 5 in a position substantially overlapping any exposed portion of the slot 59, a small rectangular sheet 61 of dielectric material such as polystyrene. Superposed on this sheet and preferably of slightly smaller dimensions so as to preclude any possibility of contact with the plate 38 is a sheet 62 of high conductivity metallic foil which effectively seals that portion of the slot 59 against escape of electromagnetic energy.

The peripheral gaps surrounding the piston 32 and the movable end plate 19 both serve to interrupt the paths of the radially directed electric vectors of extraneous oscillations such as those of $TM_{1,1,19}$ mode. Accordingly, there is a tendency for energy of such extraneous oscillations to escape through the peripheral gaps and to set up electromagnetic fields in the spaces behind the tuner piston and the movable end plate. It is found that the dielectric plate 39 of the movable end plate and the corresponding dielectric plate of the similarly constructed tuner piston serve to dissipate such extraneous oscillation energy and that this attenuation or suppression of unwanted mode energy results in an enhancement of the electromagnetic field for oscillations of the desired mode as e. g., of $TE_{0,1,19}$ mode.

The switch 16 is preferably operated by an actuator of the type disclosed in United States Patent No. 2,537,139 aforementioned. The actuator comprises a magnetic spool 67 in circuit with the key 64 and battery 65 and having a central core and integral arcuate magnetic poles 68 shown in section in Fig. 3 which tend to attract the transverse bar armature 69 to cause it to rotate 90 degrees about its central axis and align itself with the pole-pieces. Armature 69 is rigidly connected by an axial shaft to the rotary valve member 16. When the actuator is unenergized switch 16 is held in the energy interrupting position of Fig. 2 by a biasing spring 70 which impels the valve to that position in which armature 69 engages a fixed stop 71. Upon energization of the actuator the armature 69 is urged in the opposite direction against the reaction of spring 70 until a portion of the spring is brought up against a stop pin 72 thus aligning the guideway slot through the rotor of switch 16 with the guideways of the contiguous portions of wave guide 14.

Figure 2:
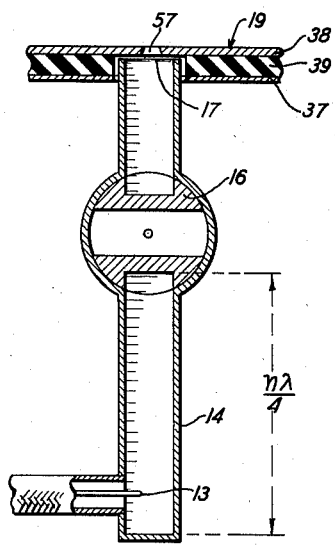
Fig. 2 is a section of the wave guide input of Fig. 1 showing the wave guide switch in its transmission interrupting position.

In operation of the apparatus disclosed as a phantom target the switch 64 is closed (see Fig. 1). This causes source 65 to energize the motor 29 and the electromagnetic actuator 66 of the wave guide switch 16, thus putting the input wave guide in the energy transmitting condition illustrated in Fig. 1. Pulses of microwaves of a duration of the order of a microsecond received at the dipole 10 are impressed by the coupler 13 upon wave guide 14 and serve to excite the resonator 15 at an instant when its resonance frequency agrees with the frequency of the incoming oscillations. Upon cessation of the impulse the electromagnetic field within the resonator serves as a source of oscillations yielding energy back through the aperture 57 to the wave guide and to the dipole 10 from which it is emitted as a relatively long decaying pulse for a period commonly designated as the "ring time" of the resonator 15. Release of the key 64 permits motor 29 to stop and wave guide switch 16 to return to its normal interrupted circuit position as shown in Fig. 2, thus stopping all transmission of energy to the resonator 15 and precluding any reaction effect of the resonator 15 upon neighboring transmitting and receiving systems.

What is claimed is:

1. A cavity resonator having a wall which includes a coupling aperture and oscillation mode suppression slits for suppressing oscillations of undesired modes, a wave guide having an open end overlying the aperture to couple with the interior field of the resonator and also overlying a slit thus giving rise to an accompanying undesired coupling and means for eliminating the undesired coupling comprising a strip of conducting foil overlying that portion of the slit exposed to the wave guide and a separator of dielectric material lying between the strip of foil and said wall.

2. A space resonance resonator of high Q having an end wall provided with a substantially plane interior surface, said end wall fitting loosely within the resonator and an extraneous mode suppressor comprising a sheet of dielectric substance affixed to said end wall back of its interior face and extending outwardly beyond said end wall to cover at least a portion of the space exposed at the periphery of said end wall, a tuning piston in said resonator and levelling means for said end wall to maintain it in true parallelism with said piston.

3. An electrical resonator of high Q comprising a conducting chamber one wall of which has a plane interior surface, said surface having a discontinuity providing an annular gap therein surrounding its effective electrical center and a plate of oscillation energy-absorbing material overlying said gap externally of the interior surface of said chamber, a tuning piston in said resonator and levelling means for said end wall to maintain it in true parallelism with said piston.

4. A cavity resonator of high Q comprising a substantially closed hollow chamber having interior surfaces of electrically conducting material, one of said surfaces comprising a wall structure mounted to permit variation of its position with respect to the chamber to vary the tuning of the resonator, said wall structure being separated by a gap at its periphery from the contiguous surfaces and having an electrically conducting disc backed by a plate of dielectric material for dissipating energy of extraneous modes which escapes through said gap, another surface being provided with levelling means for maintaining it in parallelism with said tuning surface.

5. In combination a tunable cavity resonator of high Q to store and reemit electromagnetic energy in a period of microseconds, said resonator being substantially closed and having a tapered opening therein, whereby said resonator is excited, a wave guide feed therefor and connected thereto said feed guide being hollow and having a diameter larger than said opening whereby the input energy may be concentrated in density at said opening, and a switch in said guide for closing the same and controlling the flow of wave energy to said resonator.

6. The structure of claim 5, wherein said feed section has a length $$m\frac{\lambda}{4}$$

where $m$ is an even integer.

7. The structure of claim 5, wherein said switch is positioned at a distance equal to $$n\frac{\lambda}{4}$$

where $n$ is an odd integer, from said opening.

8. The structure of claim 5, and a coaxial transducer connected to the far end of said feed, said coaxial transducer being located at $$\frac{\lambda}{2}$$

distance from said opening, where $\lambda$ is the wavelength.

9. A tunable cavity resonator, a wave guide section external to the cavity resonator and electrically connected to the cavity resonator so as to be coupled to the space therewithin for energy transduction, means for varying the tuning of the cavity resonator and means for simultaneously adjusting the dimension of the wave guide section to maintain it equivalent to an integral multiple of quarter wavelengths at the frequency of the cavity resonator, said adjusting means comprising an element for changing the propagation velocity of the wave guide section without change of the physical length of the section, as the tuning is varied over a range.

10. A cavity resonator of high Q, a wave guide section coupled to said resonator, having a resilient movable wall section, means for tuning the resonator over a relatively broad band of frequencies, and a connector between said tuning means and wall section for bowing the latter into the wave guide section to maintain the effective electrical length of said guide section constant over the tuning band.

11. A cavity resonator adapted to store and reemit electromagnetic energy comprising a closed conductive chamber of high Q having a tuning piston at one end thereof, and an end plate having a tapered coupling aperture at the opposite end, a transducing hollow wave guide coupled to said resonator through said aperture and in close proximity thereto whereby the transduced energy is concentrated at said aperture, said guide having a length integrally related to a quarter wavelength whereby said transduced energy has a maximum amplitude.

12. A cavity resonator of high Q having a fixed apertured supporting end plate and a tiltable conductive wall for reflecting wave energy, a tapered aperture in said wall, leveling means connected between said plate and wall for adjusting said wall into true perpendicularity with the principal resonator axis, and a hollow wave guide transducer contacting said wall and in registry with said aperture.

13. In combination, a high Q cavity resonator comprising a hollow cylindrical wave-guide resonant to microwaves, said wave guide emitting a long decaying pulse and having a conductive side wall and end plate, said end plate being spaced from said wall to provide a peripheral mode suppressing gap, means for degrading transverse magnetic, extraneous modes comprising an absorbing material on said end plate extending into said gap, said end plate being provided with a tapered opening for concentrating the electromagnetic energy at said resonator and a wave-guide feed fitting into said end plate contiguous to said opening.

14. In combination, a high Q cavity resonator comprising a hollow cylindrical wave-guide resonant to microwaves, said wave guide emitting a long decaying pulse and having axial symmetry, a planar end plate of conductive material providing an annular gap concentric with said axis, said gap adapted to suppress modes having radial field components, an absorber external to said resonator in contact with said gap, said absorber being provided with a rear opening, said end plate having a conical bore for increasing the density of microwave energy thereat, and a wave-guide feed flush with said bore and fitted into said absorber opening.

15. A high Q cavity resonator comprising a conductive cylinder having a reflecting plate at one end thereof and a leveled conductive plate at the opposite end spaced from the cylinder wall to provide a peripheral mode suppressing gap therewith, a wave-guide feed for said resonator and means for concentrating the electromagnetic energy from said feed to excite said resonator in a desired mode of oscillation, one of said plates being provided with a backing of material having an extension projecting into said gap and adapted to suppress extraneous modes of oscillation.

WALTER F. KANNENBERG.

(References on following page)

REFERENCES CITED

The following references are of record in the file of this patent:

UNITED STATES PATENTS

| Number | Name | Date |
|---|---|---|
| 2,044,413 | Weyrich | June 16, 1936 |
| 2,106,768 | Southworth | Feb. 1, 1938 |
| 2,109,843 | Kassner | Mar. 1, 1938 |
| 2,151,118 | King | Mar. 21, 1939 |
| 2,200,023 | Dallenbach | May 7, 1940 |
| 2,206,683 | Wolff | July 2, 1940 |
| 2,253,589 | Southworth | Aug. 26, 1941 |
| 2,267,289 | Roosenstein | Dec. 23, 1941 |
| 2,283,568 | Ohl | May 19, 1942 |
| 2,355,088 | Lavoie | Aug. 8, 1944 |
| 2,383,343 | Ryan | Aug. 21, 1945 |
| 2,396,044 | Fox | Mar. 5, 1946 |
| 2,403,289 | Korman | July 2, 1946 |
| 2,404,086 | Okress | July 16, 1946 |
| 2,409,913 | Tonks | Oct. 22, 1946 |
| 2,415,242 | Hershberger | Feb. 4, 1947 |
| 2,421,912 | Spooner | June 10, 1947 |
| 2,439,388 | Hansen | Apr. 13, 1948 |
| 2,471,419 | Edson et al. | May 31, 1949 |

FOREIGN PATENTS

| Number | Country | Date |
|---|---|---|
| 503,467 | Great Britain | Apr. 6, 1939 |